March 28, 1944. F. W. MANSON 2,345,274
MOLDED PULP EGG PACKING DEVICE
Filed Dec. 11, 1939 3 Sheets-Sheet 1
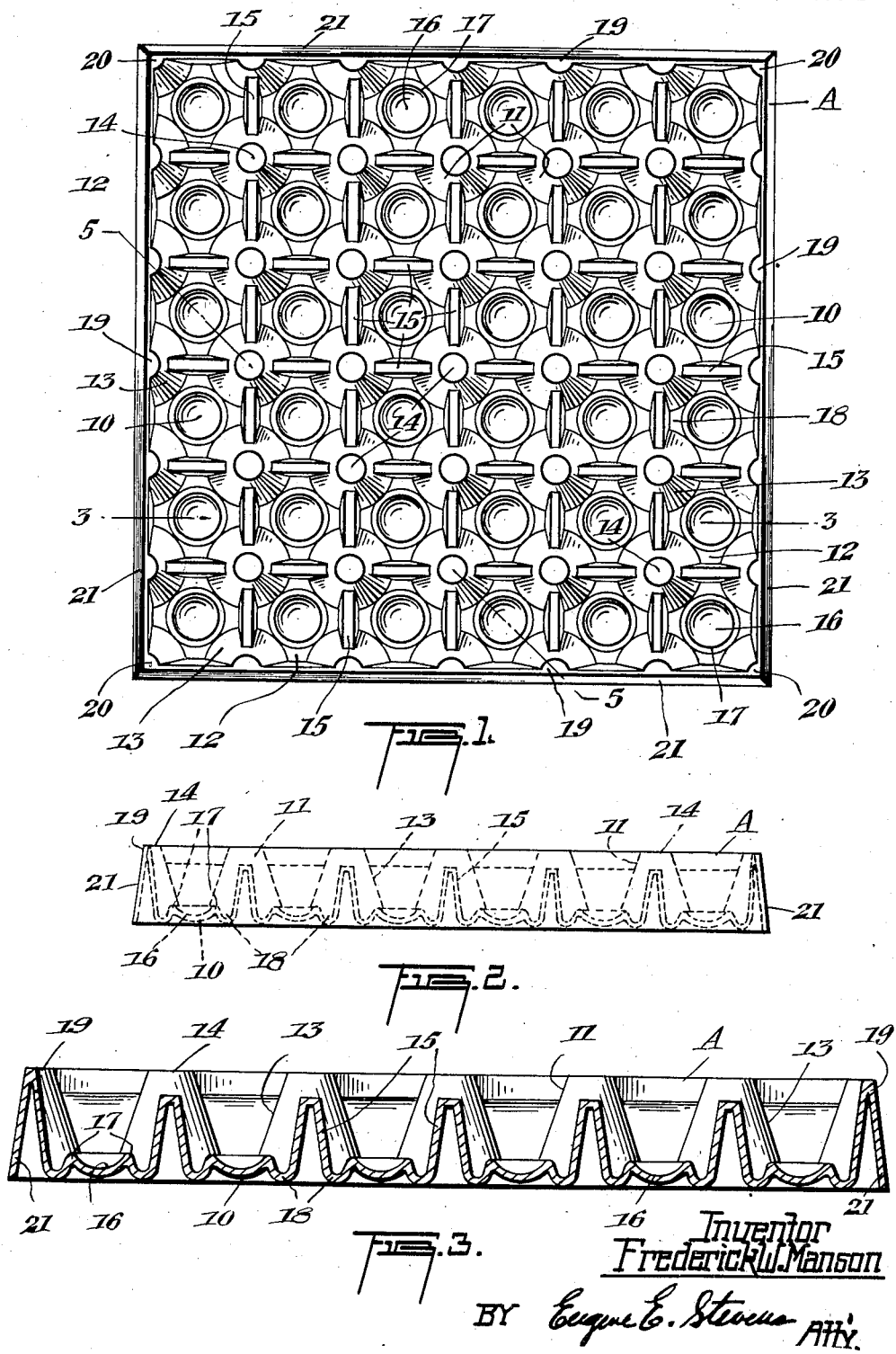
Inventor
Frederick W. Manson
BY Eugene E. Stevens
Atty.

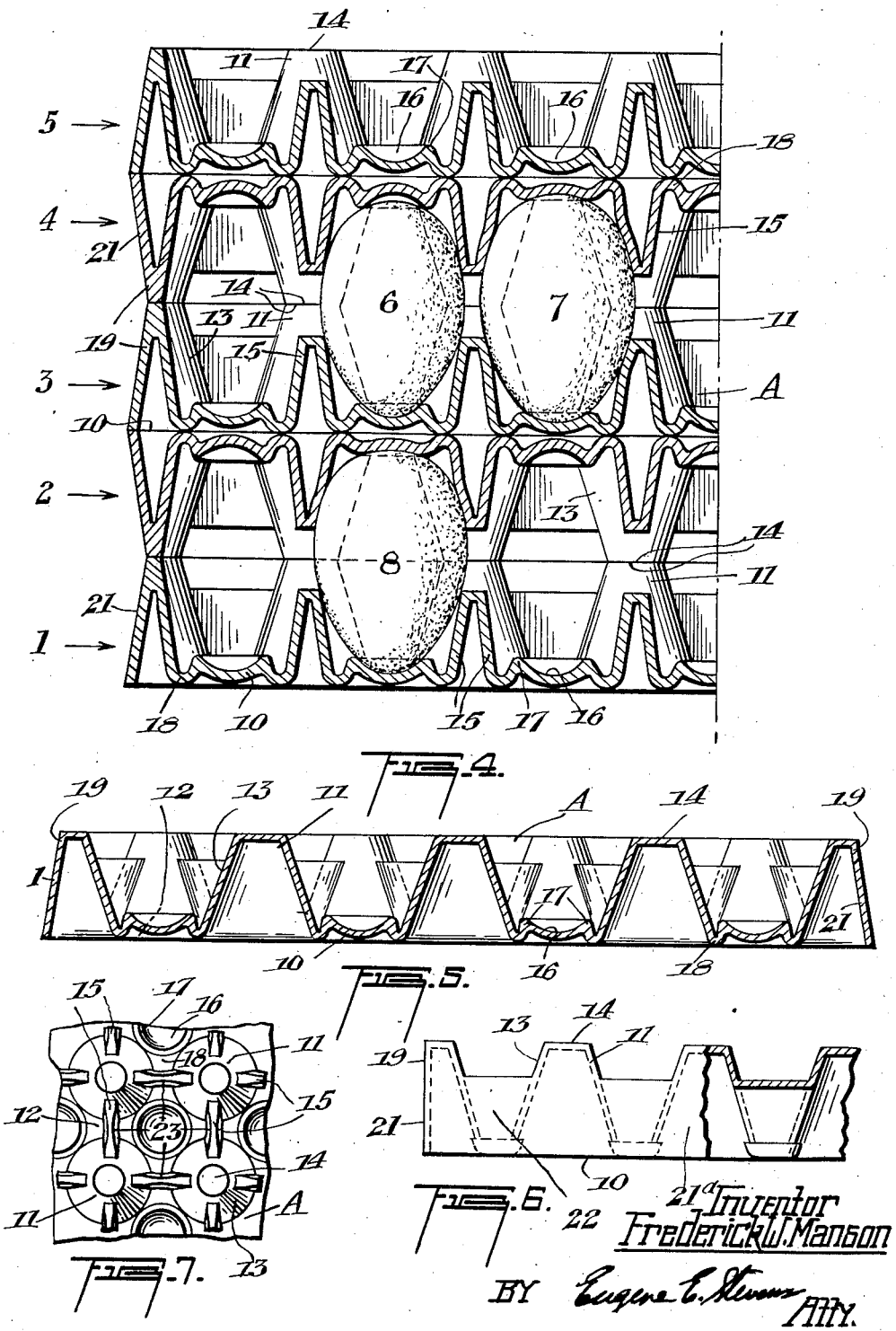

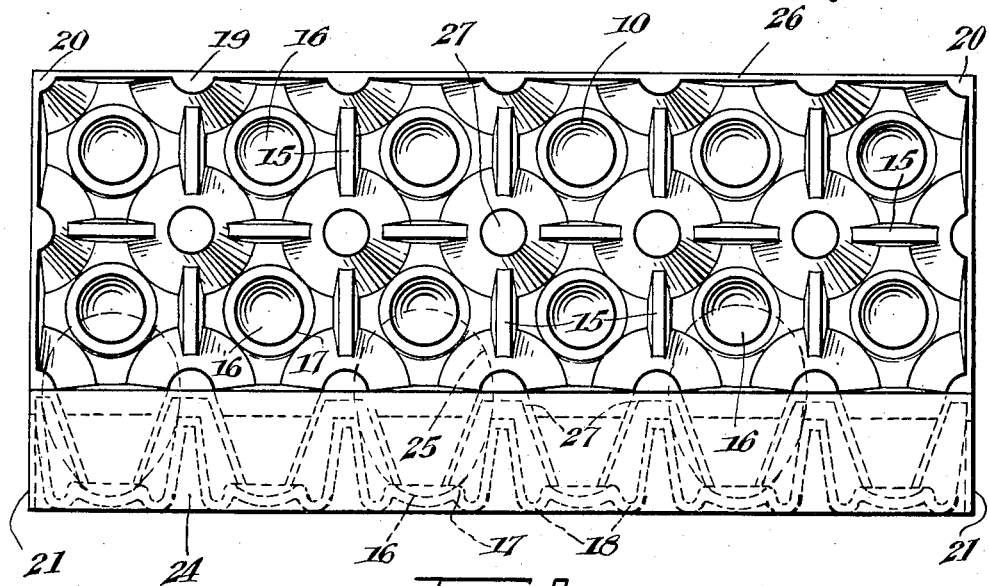
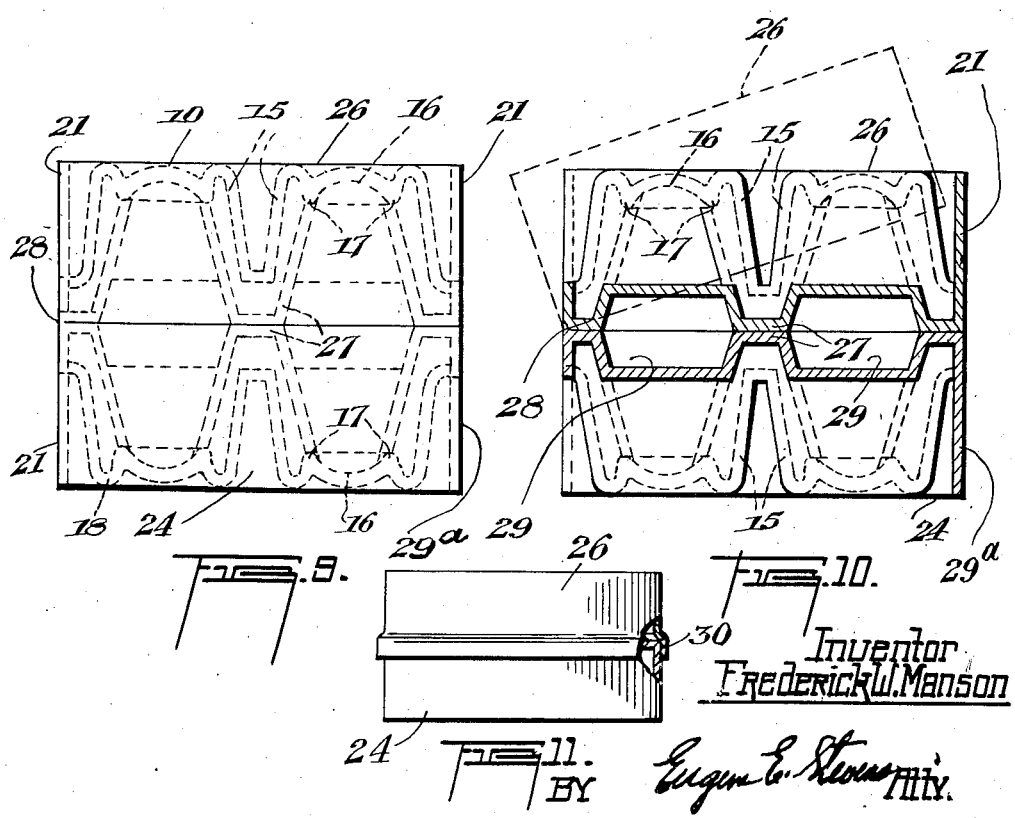

UNITED STATES PATENT OFFICE 2,345,274

MOLDED PULP EGG PACKING DEVICE

Frederick W. Manson, Toronto, Ontario, Canada

Application December 11, 1939, Serial No. 308,703

3 Claims. (Cl. 217—26.5)

This invention relates to molded pulp egg packing devices.

For many years it has been the practice to ship eggs in crates, the eggs being packed in layers, three dozen to a layer, and each layer separated by what are known as flats, i. e., cardboard partitions, each egg in each layer being separated from one another by what is known as a filler, which embodies strips of cardboard connected together to form individual compartments for the eggs. This packing method has obvious disadvantages in that the eggs were not protected from breakage to a sufficient degree and not only does such a method permit a large percentage of breakage but it also has resulted in considerable loss through spoilage due to the fact that the fluid material from the broken eggs may flow along the flat and contact all the other eggs in the layer and in other layers. Moreover, having regard to variations in egg sizes and the fact that the compartment of each filler is of one standard size sufficient to accommodate the largest eggs, smaller eggs could not be held in a substantially rigid vertical position so that, as a result of being disposed at an incline, the air cells in the eggs have been dislodged from their normal positions, thus degrading them.

To replace this type of packing, molded pulp devices have been proposed in a form which combines fillers and flats and are sometimes known as combination egg fillers and flats, designed to hold the eggs in a relatively rigid vertical position so as to avoid degradation of the eggs as well as to accommodate various sized eggs and reduce the possibility of breakage to a very material degree. However, these molded fibrous articles have had apparent disadvantages. On the one hand in endeavouring to provide a molded combination filler and flat or egg tray with three dozen egg-receiving pockets, six pockets to a side, the resultant article was larger than the standard size of crate so that the article was impractical and not adopted generally in the trade. On the other hand in producing a molded combination filler and flat which was of standard size, it was found necessary to reduce the number of pockets in each layer so that the resultant article carried but two and a half dozen eggs to the layer, the pockets being disposed in the order of five along one side and six along another. While this proposal has been adopted to a considerable extent, the fact that it is only capable of carrying two and a half dozen eggs to the layer presents a material disadvantage in that in grading the graders have for years been used to three dozen eggs to the layer and consequently it is very easy for them to tabulate the number of eggs graded and put into each crate progressively as the crate is being filled. However, considerable difficulty has been experienced where the layers contain only two and a half dozen and the speed at which egg grading operations can be carried out has been, in consequence, reduced considerably.

A further disadvantage of this type of filler and flat has resulted in the fact that the pockets for receiving the eggs have been extended downwardly from the normal plane of support, to provide for expansion in the case of large eggs, and a supporting pocket on one side of the filler and flat results in a projecting post or the like on the opposite side of the filler and flat. As a result, therefore, in stacking the fillers and flats in a crate in egg supporting relationship, it is necessary to rotate each supporting tray through 90°, otherwise the trays tend to nest. Moreover, in the case of stacking the trays so as to cause them to nest one in the other when not supporting eggs, it is necessary likewise to rotate the trays to provide for such nesting. These facts also constitute disadvantages as they make it necessary for the egg graders or those handling the trays to go through a general routine of turning the trays and it is necessary to watch the trays when handling them to be certain that they are held in the proper manner so as to coact with an adjacent tray; otherwise the user must work with a hit-and-miss method and its consequent delay in arranging the trays properly.

Apart from these disadvantages, this type of tray, or filler and flat, while avoiding considerable breakage that takes place under the older method, does not prevent breakage to a degree which is possible. This is due to the fact that the eggs of each layer are supported in staggered relation to those in the next, the top of one tray supporting a layer of eggs and the bottom forming a direct covering and support for the lower layer, leaving but one thin thickness of material therebetween, with the eggs interlapped between layers. In the case of larger eggs, therefore, when an egg compartment is distended, the adjacent interlapped eggs of two layers may press upon one another through the tray in a substantially sidewise direction and at a point where the eggs are less resistant to pressure, with resultant breakage.

It is an object of the present invention to provide a molded egg tray in the form of a combination filler and flat, which will avoid the disadvantages of the prior art and provide a tray of standard size to fit the standard egg crate, and which at the same time is adapted to carry three dozen eggs per tray.

A further object of the invention is to provide a construction of this character which will support the eggs vertically in a relatively rigid manner whether the egg is large or small.

A further object of the invention is to provide a construciton in which eggs are supported on one side of the tray only, the eggs being disposed one above the other when disposed in layers of grouped trays and separated by more than one ply of material so constructed as to cushion the eggs and permit of expansion in the case of the larger eggs.

A still further object of the invention is to provide a tray that may be nested with other trays or mounted in relation with other trays without the necessity of rotating the tray and performing a special operation in order to cause the tray to mate with the adjacent tray upon which it is being placed.

A still further object of this invention is to provide a tray of this character which may be manufactured economically.

According to the present invention I provide an egg tray or combination filler and flat which is molded from fibrous material, is adapted to contact with eggs only on one side and has on that side only, projecting posts formed with sloping sides and blunt tops so arranged that each group of four is adapted to support a single egg. Each group of four posts therefore defines an egg receiving compartment which is preferably provided with a base in the form of a yieldable egg supporting cushion, the base of the tray being formed by the egg supporting cushions of the compartments formed within the tray. The posts and cushions are arranged in staggered relation to one another and, in the case of egg trays for crates, the posts along the marginal edges of the tray take the form of partial posts, that is, half posts and quarter posts having a supporting surface projecting within the marginal edges of the tray so as to form normal compartments along the marginal edges as well as within the body of the tray. In this way it is possible not only to provide a molded egg tray which is very efficient in character but one which will support three dozen eggs, the tray being square and of a size to fit the standard egg crate.

The advantages of the invention and specific details of construction will be apparent from a consideration of the following specification taken in conjunction with the accompanying drawings.

In the drawings,

Figure 1 is a top plan view of a molded egg tray according to the present invention.

Figure 2 is a side elevation of Figure 1.

Figure 3 is a section taken on the line 3—3 of Figure 1.

Figure 4 is an enlarged fragmentary section taken transversely through a number of trays mounted one upon the other to enclose layers of eggs.

Figure 5 is an enlarged transverse section taken on the line 5—5 of Figure 1.

Figure 6 is a fragmentary side elevation partly in section of a tray showing a modified form of said wall.

Figure 7 is a fragmentary detail showing a modified form of partition between the supporting posts of the tray.

Figure 8 is a front elevation of a carrier for one dozen eggs, constructed according to the present invention and shown with the top cover standing upwardly.

Figure 9 is an end elevation of the carrier illustrated in Figure 8 with the cover completely closed.

Figure 10 is a section taken through the closed carrier along one line of the posts to show the manner in which one section is hinged to the other, and Figure 11 is an end elevation of a carrier for one dozen eggs wherein the upper and lower sections are separate from one another.

Referring to the drawings, A indicates a molded egg tray according to the present invention which is preferably made of paper pulp molded to provide a unitary article throughout. In Figure 1 I have shown a plan view of a square tray designed for use in standard egg crates. This includes a base 10 which preferably takes the form of a plurality of egg supporting cushions positioned to locate a plurality of egg compartments. Pressed from the base are a plurality of tapered egg supporting posts 11 disposed in staggered relation to the supporting cushions and projecting wholly on one side of the base. Surfaces of four of these posts surround each egg supporting cushion and these with the egg supporting cushion form egg compartments 12.

The posts 11 are preferably frusto-conical in shape, thus presenting a convex surface 13 to each compartment 12, gradually increasing in radius as it approaches the base, the top of each post providing a flat bearing surface 14 which will firmly support the corresponding post of another tray superimposed on it.

Also pressed from the base are a plurality of partition walls 15 which extend between pairs of posts and bound each compartment 12. The supporting cushions, posts 11 and partitions 15 are yieldable, the posts and partitions being hollow, and consequently will yieldably support an egg in each compartment. The posts 11 taper outwardly from top to bottom to a degree such as to support the average small egg so that when disposed in a compartment it is supported from four points in respect to the posts bounding each compartment, and is supported at its end by the cushion at the base of each compartment. It will also meet the partition walls in light, bearing engagement.

The cushions at the base of each compartment are preferably cup-shaped, as indicated at 16, the upper edges 17 thereof being supported beyond the plane of the base by means of an intervening web of material 18, extending circumferentially of the cushions and between the latter and the posts 11 and partitions 15. This web of material permits the cushion to yield to a considerable degree without being forced beyond the plane of the base, whereas the hollow posts 11 and hollow partitions 15 permit yielding of their walls inwardly to a substantial degree. Thus, by arranging the boundaries of the compartments to engage the average small egg in bearing engagement, the compartments will also accommodate the largest egg through the fact that the cushion base and yieldable posts and partitions will provide for enlargement of the compartment to the desired degree when larger eggs are placed in it. All of the compartments have these characteristics.

The marginal compartments in a tray of this kind are bounded by what I term partial posts which take the form of half posts 19 in the intermediate portion of each side wall of the tray and substantially quarter posts 20 at the ends of each side wall, or in other words at the corners of each tray. Each of these partial posts presents a convex surface to each compartment 12 which it bounds and this convex surface is subject to distortion or to yielding by reason of the fact that each partial post is hollow in a similar manner to the posts within the body of the tray. The partial posts are bounded on their opposite sides by a wall 21 which may be in the form of a continuous wall bounding each tray, and of a height corresponding to the posts throughout the length of the wall, or may be merely individual partition walls 21a enclosing the hollow part of the partial posts and extending in the form of a narrower web 22 between the partial posts, as shown in Figure 6. By employing this arrangement of posts and base supports I am able to produce egg trays for standard egg crates having six compartments to a side, thus providing a capacity for three dozen eggs, and the overall width of the square tray need not exceed 11½ inches.

The trays are designed to be used two to a layer, a lower tray supporting the eggs and an upper tray shielding and holding the upper part of the egg. In this connection, reference is made to Figure 4, wherein a grouped series of trays is illustrated. For convenience of description each pair of trays shown is numbered from 1 to 5, trays 1 and 2, 3 and 4 and 5 plus an additional tray, and so on, comprising one layer. It will be noted that the bases of trays 1, 3 and 5 are disposed downwardly, while those of trays 2 and 4 are disposed upwardly, trays 2 and 4 having been reversed so that their posts 11 are superimposed directly upon the posts of the lower trays. The eggs supported between the posts are therefore supported directly one above the other and it will be noted that the cushion bases 10 of each compartment (which also form the base of the tray) form a double ply of material between the eggs superimposed one above the other. Moreover, these cushions are spaced apart from one another so that, even in the case where there is some expansion of the cushion, the eggs are well protected from one another, whereas, if two extremely large eggs happened to be positioned directly above one another and the cushions were finally caused to touch, there still remains two plies of material between the eggs and the eggs bearing against one another through the two plies do so along their longitudinal axis where they are more resistant to pressure.

Attention is directed to the various sized eggs illustrated in Figure 4. Egg 6 is designed to represent the small average egg and it will be seen that it fits neatly within its compartment in light bearing engagement with the upper and lower cushions 10, the side partitions 15 and posts 11. Egg 7 is designed to represent a large egg which is relatively large at its point also. It will be seen in this case that the partition walls 15 tend to yield and distort to accommodate the egg while both the upper and lower cushions 10 are likewise distorted, yet this egg is safely and firmly accommodated in the compartment. Egg No. 8 is designed to represent a large egg but wherein its point is not abnormal. In this case the upper partition and the upper cushion 10 are somewhat distorted. It will be noted, however, in the case of large eggs particularly, that the partition walls are such in width that notwithstanding distortion they are designed to accommodate large eggs side by side and still maintain them from contacting with one another. In this connection, the posts operate to coact with the partitions in accommodating the egg in this manner. If desired, the partition walls 15 may be slightly concave as at 23 (see Figure 7).

In mounting the trays one upon the other, it will be appreciated that no special operation is necessary other than reversing the top tray in order to get the trays to mate. This will be apparent particularly, upon considering Figure 1 since the structure is square and symmetrical throughout and if the sides of the tray were labelled in each case, north, south, east and west, it would not matter whether the east side of tray 2 was disposed adjacent to the north, south, east or west side of tray 1. This fact, it will be appreciated, presents an advantageous factor in the quick handling and stacking of the trays.

It will be appreciated also, that since the egg supporting posts project wholly on one side of the base, the cavities thus formed on the opposite side of the base, will readily receive the posts of a lower tray when it is desired to nest the trays, so that when the base of one tray is presented to the top of the other, the trays may be stacked in nesting arrangement very readily. It should be noted also that the base of each tray provides a solid support for the tray of the next layer superimposed upon it since it presents a bearing surface of large area and a sturdy superstructure of trays is therefore built when they are arranged in each crate.

A series of ten trays is employed to accommodate fifteen dozen eggs in the standard size crates or in one side of the standard size double crate so that it will be appreciated that five additional trays arranged in the same manner would be superimposed above tray 5 in Figure 4. It will be apparent also that the topmost tray which would be tray 10, would be disposed in the same manner as trays 2 or 4 so that the top of the crates would present a closed squat surface such as provided by the bottom tray 1 on the bottom of the crate, the uppermost and lowermost layers of eggs in the crate being thus carefully covered.

The sides of the structure would also be enclosed when employing a complete side wall such as 21, on each tray. It will be noted in this connection that the design of tray permits the use of a side wall of this character which will readily mate with the side walls of adjacent trays, the walls extending upwardly from the base to the top of the posts. The tray also lends itself to the use of a side wall extending from the base up to the top of the posts in the area of the posts, with the wall reduced in height between the posts so as to provide an open passageway therebetween, as shown in Figure 6, should this be desired. In either case a well finished tray is formed which may, if desired, be provided with finger notches along the sides. The exterior wall may be of sloping character, such as shown in Figure 4, or may, if desired, be absolutely vertical, as shown in Figure 6.

In the preferred form of construction the posts are frustro-conical throughout, presenting a convex bearing surface to each egg compartment. It is obvious, however, that the posts might take the form of truncated pyramids, or in other words, formed with four plane surfaced side walls so that it is to be understood that the term "frustro-conical" where used in this application is designed to embrace such a variation.

The construction provides for many advantages. In addition to those indicated in the foregoing description, it will be noted that the posts play a major part in supporting the eggs as well as defining the compartment, and form a pedestal support for another tray superimposed thereon, and that the cushion base in the compartment will yield to pressure of a large egg and will not present any edges or ridges which will not tend readily to yield. It will also be apparent that since the egg is confined in a well defined compartment, there will be no possibility of spoiling of the eggs in the case where an egg may be broken, as the contents thereof would be held within the compartment.

While the structure is particularly adaptable to egg crate packing in order to provide better packing facilities, while employing the usual standard crate with three dozen eggs to a layer, it will be apparent that the development may also be applied to other modes of packing, such as a carton for packing a lesser number of eggs.

In Figures 8, 9 and 10, I have illustrated the manner in which the invention may be applied to forming a carrier for one dozen eggs.

Referring first of all to Figure 8, 24 indicates the supporting tray having twelve egg compartments formed as previously described and designed to support eggs as shown in dotted lines at 25. The covering tray is indicated by the numeral 26 which, similarly to the supporting tray 24, includes the frustro-conical posts 27 projecting from one side of the base, the structure preferably including yieldable egg supporting cushions 10 which form the base for each tray. The supporting and covering trays 24 and 26 are hingedly connected with one another as at 28, see Figures 9 and 10, so that the covering tray 26 may be swung over the supporting tray 24 to enclose the eggs positioned within the compartments in the latter. This type of smaller carrier may be formed by dieing a flat tray providing 24 compartments, the tray being split so that one half will hinge upon the other as at 28 and thus form the lower supporting tray 24 and upper covering tray 26.

This type of carrier may be provided with marginal side walls 29 as shown in Figure 10 which are designed to extend around the front and end walls of the tray structure the rear wall along which the hinge 28 is formed having an opening in a position to register with each compartment along the length of said wall and of a character corresponding to the openings 29a occurring between each compartment, the openings being formed by the structure of each tray when cut along the posts extending between each section of the tray. However, it is possible to have these openings along the rear wall filled in by a partition which may be formed in the molding of a tray.

In this type of construction the egg is supported in an exactly similar manner to that previously described in connection with trays for crates, the post structure and partitions yieldably supporting the egg and the cushions 10 also functioning in this respect to accommodate large or smaller sized eggs.

It will be noted that sections 24 and 26 are hinged along one line of posts 27 so that when the upper section or cover 26 is swung upon the lower supporting section 24, the top bearing surface of the posts 27 of each section neatly meet with one another.

The carrier for one dozen eggs described might also be formed in two separate sections, as illustrated in Figure 11, wherein preferably the upper section is formed with a peripheral receiving channel 30 which is formed by a skirt disposed around the entire periphery of the upper section and designed to fit over the upper edges of the lower section as shown.

The base structure provided by the formation of the trays, whether they are separate from one another or connected together, presents a neat, readily handled surface for the carrier and it will be obvious that the supporting and covering sections 24 and 26 may be held in closed position in any suitable manner. They might, for instance, be held together by passing a gummed band of paper around the sections, the paper carrying suitable advertising and identifying matter suitable to the person or concern selling eggs in such a carrier.

It will be appreciated, therefore, that the structure produced according to the present invention may be employed in various manners and sizes for the transportation and/or marketing of eggs and in any of the forms in which it may be employed it will function efficiently to protect the eggs.

It will be further appreciated that in all its forms a simplified structure is provided since the posts, which perform an important part in the supporting of each egg, project in all cases from only one side thus providing for a relatively shallow tray, and an outside surface which does not present a plurality of projections that would render the structure inconvenient to handle.

Of particular importance, of course, is the fact that the invention will permit the formation of a tray for crates, square in shape and of a size to fit a standard egg crate and hold three dozen eggs in each layer so that the crating of eggs may be carried out similarly, but with more convenience, than the older method of filler and flat, and with greater protection to the eggs. Apart from this it is apparent that this tray has material advantages over and above pressed fibre trays heretofore known in the art.

I claim:

1. An egg carrier which is molded from fibrous material and is adapted to contact with eggs only on one side and has, on that side only, projecting posts formed with sloping sides and blunt tops so arranged that each group of four is adapted to support a single egg and a plurality of flat surfaced partition walls pressed from the base, each wall extending upwardly from the base substantially to the top of each post to bound an egg compartment formed between each four posts, and concavities formed in the opposite faces of each partition wall adjacent its centre to accommodate large sized eggs when the walls of the posts are distorted outward by the egg when inserted in the egg compartment.

2. An egg carrier which is molded from fibrous material and is adapted to contact with eggs only on one side and has, on that side only, projecting posts formed with sloping sides and blunt tops so arranged that each group of four is adapted to support a single egg and a plurality of partition walls pressed from the base, each wall extending upwardly from the base substantially to the top of each post to bound an egg compartment formed between each four posts, and a yieldable cushion base for each compartment projected upwardly therein, said cushion base having side margins which rise upwardly from the base of the partition walls to a point intermediate the upper and lower edges of the latter and a concave supporting member extending between the side margin of the base to form a downwardly yielding cushion support for the end of each egg.

3. An egg carrier as claimed in claim 1 in which each compartment is provided with a cushion base, the side margins of which rise upwardly from the base of the partition walls to a point intermediate the upper and lower edges of the latter and a concave supporting member extending between the side margins of the base to form a downwardly yielding cushioning support for the end of each egg.

FREDERICK W. MANSON.